(12) United States Patent
Yanagihara et al.

(10) Patent No.: US 11,635,641 B2
(45) Date of Patent: Apr. 25, 2023

(54) PLANAR-LIGHTWAVE-TYPE OPTICAL DEVICE

(71) Applicant: Nippon Telegraph and Telephone Corporation, Tokyo (JP)

(72) Inventors: Ai Yanagihara, Atsugi (JP); Kenya Suzuki, Atsugi (JP); Ryoichi Kasahara, Atsugi (JP); Kazunori Seno, Musashino (JP); Yuko Kawajiri, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 204 days.

(21) Appl. No.: 16/768,461

(22) PCT Filed: Nov. 30, 2018

(86) PCT No.: PCT/JP2018/044320
§ 371 (c)(1),
(2) Date: May 29, 2020

(87) PCT Pub. No.: WO2019/107571
PCT Pub. Date: Jun. 6, 2019

(65) Prior Publication Data
US 2020/0363694 A1 Nov. 19, 2020

(30) Foreign Application Priority Data

Dec. 1, 2017 (JP) .............................. JP2017-232118

(51) Int. Cl.
*G02F 1/01* (2006.01)
*G02F 1/313* (2006.01)

(52) U.S. Cl.
CPC .......... *G02F 1/0147* (2013.01); *G02F 1/3132* (2013.01); *G02F 2201/12* (2013.01)

(58) Field of Classification Search
CPC .... G02F 1/2257; G02F 1/0147; G02F 1/3132; G02F 1/212; G02F 2201/12; G02B 6/12
(Continued)

(56) References Cited

U.S. PATENT DOCUMENTS 8,674,220 B2 * 3/2014 Loibl ..................... H05K 1/147
174/50.53
9,360,629 B2 * 6/2016 Watanabe ............. G02F 1/3137
(Continued)

FOREIGN PATENT DOCUMENTS

| JP | H11-233542 A | 8/1999 |
| JP | 2014-500620 A | 1/2014 |
| JP | 2016-142855 A | 8/2016 |

OTHER PUBLICATIONS

T. Watanabe, et al., *Silica-Based PLC Transponder Aggregators for Colorless, Directionless, and Contentionless ROADM*, OFC/NFOEC Technical Digest 2012 OSA, pp. 3.
(Continued)

*Primary Examiner* — Robert Tavlykaev
(74) *Attorney, Agent, or Firm* — Workman Nydegger

(57) ABSTRACT

A problem is to provide a planar lightwave circuit optical device capable of facilitating mounting of connection to a printed circuit board and realizing downsizing of a device chip. A planar lightwave circuit optical device of the present invention is characterized by mounting an electrical connector (FPC connector) by means of soldering on an electrode pad of an electrical wire connected to an electrical drive unit (such as a heater) in a device formed by using a planar lightwave circuit (PLC).

11 Claims, 13 Drawing Sheets

(58) Field of Classification Search
USPC .......................................................... 385/1–3
See application file for complete search history.

(56) References Cited

U.S. PATENT DOCUMENTS

| | | |
|---|---|---|
| 2002/0158190 A1 | 10/2002 | Dieckroger et al. |
| 2004/0086220 A1* | 5/2004 | Mino .................... G02F 1/3132 |
| | | 385/22 |
| 2012/0115319 A1 | 5/2012 | Mieczkowski et al. |
| 2014/0185978 A1 | 7/2014 | Liao et al. |

OTHER PUBLICATIONS

T. Shibata, et a., *Silica-Based Waveguide-Type 16 × 16 Optical Switch Module Incorporating Driving Circuits*, IEEE Photonics Technology Letters, Sep. 2003, vol. 15, No. 9, pp. 1300-1302.
Tadashi Osawa, *Soldering Engineering: From Theory to Practical Application*, Maruzen Publishing Co., Ltd., 2012, pp. 123-124.

* cited by examiner

PLANAR-LIGHTWAVE-TYPE OPTICAL DEVICE

TECHNICAL FIELD

The present invention relates to a planar lightwave circuit optical device used in optical communications.

BACKGROUND ART

With an increase in Internet traffic in recent years due to, for example, proliferation of smartphones and IoT (Internet of Things) services, the need for network flexibility is growing as well as the need for an increase in communication capacity. This raises a demand for a CDC-ROADM system that realizes optical network flexibility. Since the CDC-ROADM system includes a multicast switch using planar lightwave circuit (PLC) technology as an essential device, it is desired to reduce the cost of the switch (NPL 1).

A PLC optical switch applies heat to a waveguide by means of a heater loaded on the waveguide to change the index of refraction of the waveguide and change the state of interference of an interferometer formed in the PLC, thereby realizing switching. For example, a 16×16 optical switch needs to drive at least 256 heaters individually (NPL 2). Thus, in the PLC optical switch, electrical wires accessing the heaters on the waveguides occupy a large area of the planar lightwave circuit chip, which forms a bottleneck in downsizing of the PLC chip. In short, the electrical wires are an obstacle to cost reduction of the PLC optical switch.

CITATION LIST

Non Patent Literature

NPL 1: T. Watanabe, K. Suzuki, T. Takahashi, "Silica-based PLC Transponder Aggregators for Colorless, Directionless, and Contentionless ROADM," OFC/NFOEC Technical Digest 2012 OSA NPL 2: T. Shibata, M. Okuno, T. Goh, T. Watanabe, M. Yasu, M. Itoh, M. Ishii, Y. Hibino, A. Sugita, and A. Himeno, "Silica-based waveguide-type 16×16 optical switch module incorporating driving circuits," IEEE PHOTONICS TECHNOLOGY LETTERS, SEPTEMBER 2003, VOL. 15, NO. 9

NPL 3: Tadashi Osawa, "Soldering engineering: from theory to practical application," Maruzen Publishing Co., Ltd., 2012, pp. 123-124

SUMMARY OF INVENTION

A problem to be solved by the present invention is to reduce the area of electrical wires accessing heaters, which has been a bottleneck in downsizing of a conventional PLC switch.

FIG. 1 shows a configuration of a conventional PLC optical switch.

In FIG. 1, an input optical fiber array 103a and an output optical fiber array 103b are connected to the respective ends of a PLC chip 101 via fiber blocks 104a and 104b to input and output an optical signal. In the PLC optical switch, heaters necessary for optical signal processing are connected to electrode pads 110a, 110b . . . formed on a side of the PLC chip 101 not connected to the fiber block 104a or 104b and electrode pads 111a, 111b . . . formed on a control substrate 102 including an electrical circuit for heater driving via fine gold wires 106, respectively. The PLC chip 101 and the control substrate 102 are generally fixed onto a mount 105 formed of metal with an adhesive or the like.

In this structure, the positions of control heaters are distributed on the PLC chip 101 under the constraint of the layout of the optical circuit. Thus, electrical wires connecting the respective heaters to the electrode pads 110a, 110b, . . . should be routed through the chip. This routing is a major factor of increasing the area of electrical wires on the chip. In particular, since the PLC optical switch changes the optical interference state by applying power of several hundred mW, it is necessary to feed a large current through the wires. Accordingly, a certain wire width is required, which also contributes to an increase in the area of the chip.

FIG. 1(b) is an enlarged view of dash-dotted line area 112 in FIG. 1(a), showing a relationship among optical waveguides, heaters, and wires in a PLC chip. A PLC optical switch generally realizes a large-scale switch by combining a plurality of 2×2 switches using Mach-Zehnder interferometers. An optical signal input to a waveguide 121 is input to a Mach-Zehnder interferometer 122 and branched into two signals by a first directional coupler 128. One of the two branched signals is phase-modulated by a heater 123 loaded on a waveguide arm forming the Mach-Zehnder interferometer and the interference state of the signal is controlled at the time of multiplexing by a second directional coupler 129. For example, if the two waveguide arms have the same length, the optical signal is routed to a waveguide 130 in the case of not applying power to the heater 123 and is routed to a waveguide 131 in the case of applying power to the heater 123 and modulating the phase of the signal passing through the waveguide under the heater 123 by 180°.

In a large-scale optical switch, a plurality of Mach-Zehnder interferometers are arranged as shown in FIG. 1(b). Each Mach-Zehnder interferometer is provided with a heater for driving, and wires 124a, 124b . . . for supplying power to the heaters are arranged on the PLC chip. The wires 124a, 124b . . . for wire bonding are routed up to the edge of the chip. As shown in FIG. 1(b), an area on the PLC necessary for wire routing is obtained by multiplying the sum of the wire width and the wire interval by the number of wires, which occupies a large area of the PLC chip. For example, in the case of supplying power to 64 heaters, if the wire width and the wire interval are both 100 µm, a wire area 127 occupies a width of 64×(100+100) µm=12.8 mm.

Further, in the case of accessing each heater using wire bonding, a large-scale optical switch such as a 16×16 switch requires connecting at least 256 wires, which leads to a raise in mounting cost. In addition, the material for the gold wires per se is expensive.

Moreover, an inspection of the PLC optical switch requires contact of a prober to each electrode pad or use of a multipolar pin prober or the like. The former causes an increase in process cost and the latter causes an increase in inspection equipment cost.

The present invention provides means for realizing downsizing and cost reduction of a PLC optical device that includes an optical switch and performs optical signal processing by electrically changing an optical state. More specifically, the present invention provides a method of accessing an electrical drive element (heater of an electrical drive unit) using wire bonding, which is a problem in a PLC optical device requiring electrical driving. It should be noted that the electrical drive unit includes a Mach-Zehnder interferometer and the Mach-Zehnder interferometer includes the heater directly driven by electricity.

The present invention is characterized by comprising the features described below to solve the above problem.

A planar lightwave circuit optical device of the present invention comprises:

an electrode pad over a surface of a planar lightwave circuit;

a solder layer over the electrode pad and in contact with the electrode pad; and an electrical connector in contact with the solder layer.

The electrode pad includes a laminated structure of at least two layers and the laminated structure comprises a barrier layer for improving adhesion of the solder to the electrical connector.

The electrode pad may comprise a contact layer on the barrier layer.

The electrode pad may include a laminated structure of a first adhesive layer and an electrically conductive layer between the top surface of the planar lightwave circuit optical device and the barrier layer and include a second adhesive layer on the contact layer.

The barrier layer may include Ni or Pt, the contact layer may include Au, the second adhesive layer may include Ti or Cr, and the electrically conductive layer may include Au, Ag, or Cu.

The planar lightwave circuit optical device may be a silica-based optical waveguide comprising a core and cladding of a silica-based material formed on a silicon substrate or a silica substrate, a silicon waveguide comprising a silicon waveguide formed on a BOX layer on a silicon substrate, or a semiconductor waveguide formed on a semiconductor substrate such as InP or GaAs.

The planar lightwave circuit optical device may have a cable for supplying power to the electrical connector, one end of the cable being connected via a second electrical connector engaging with the electrical connector, the other end being connected to the control substrate.

DESCRIPTION OF EMBODIMENTS

Figure 1:
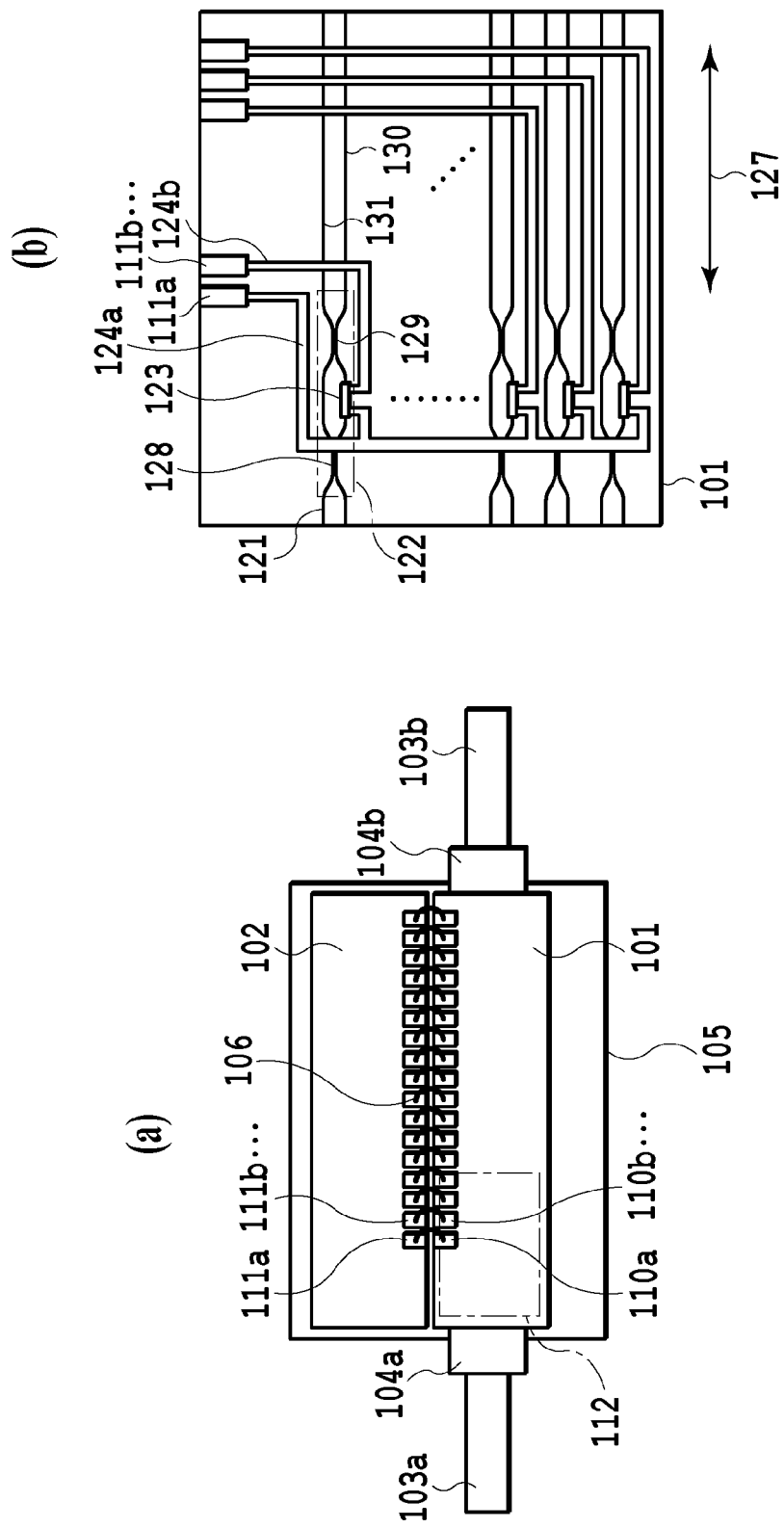
FIG. 1(a) is a top view showing a configuration of a conventional PLC optical switch.
FIG. 1(b) is a diagram showing a relationship among optical waveguides, heaters, and wires in the PLC chip shown in FIG. 1(a)

Embodiments of a planar lightwave circuit optical device of the present invention will be hereinafter described in detail with reference to the drawings. It is evident to one skilled in the art that the present invention is not limited to the embodiments described below and the embodiments and the details can be variously changed without departing from the spirit of the invention described herein. Further, configurations of different examples can be implemented in combination as appropriate. It should be noted that in the configurations of the invention described below, the same reference numeral is assigned to the same portions or portions having the same function and the description thereof is not repeated.

Example 1

Figure 2:
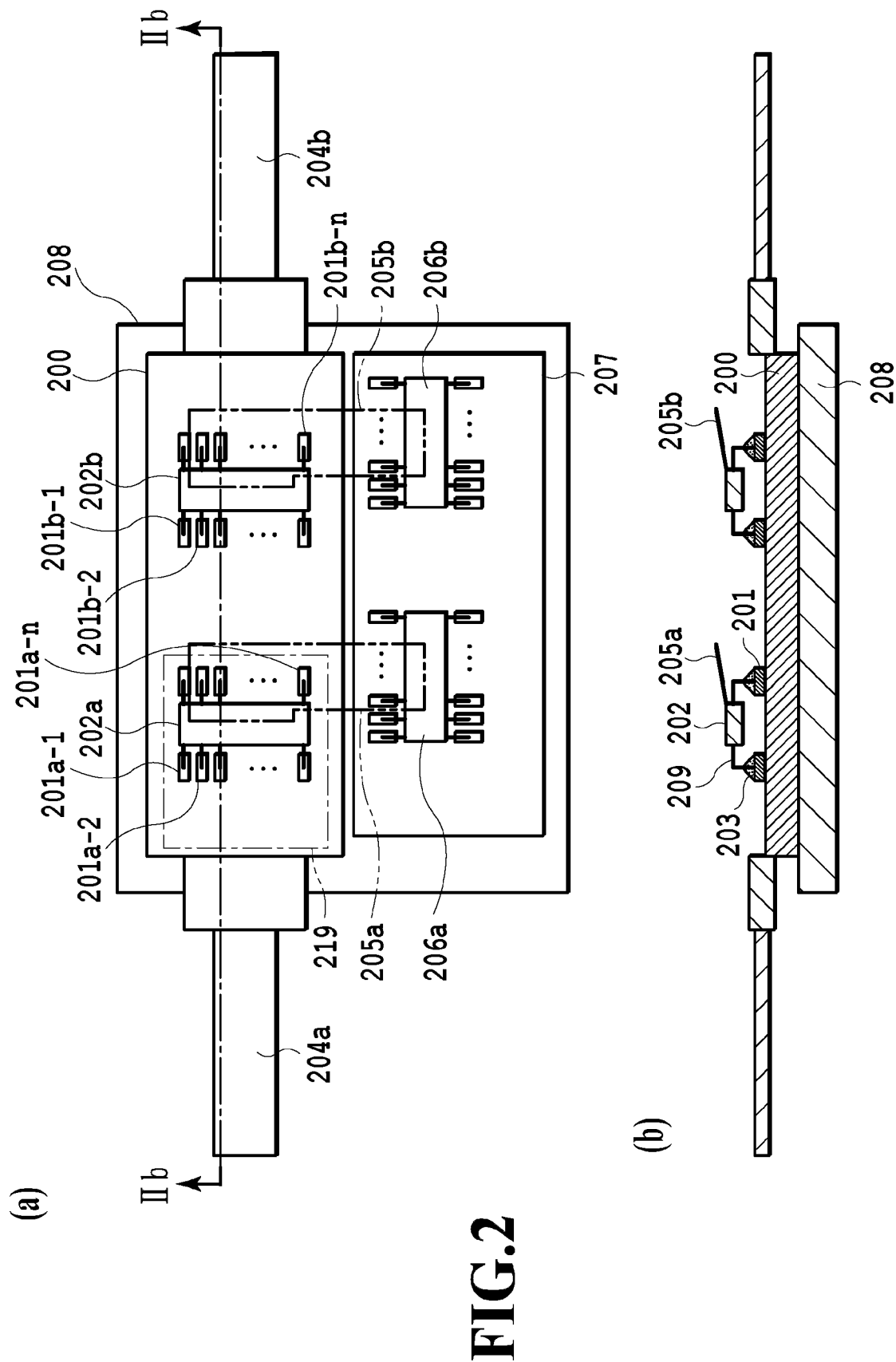
FIG. 2(a) is a top view of a planar lightwave circuit optical device of Example 1 of the present invention.
FIG. 2(b) is a side view of the planar lightwave circuit optical device of the present invention.

FIG. 2(a) and FIG. 2(b) are schematic views of a structure of a planar lightwave circuit optical device of the present invention. FIG. 2(a) is a top view and FIG. 2(b) is a side view. In FIG. 2, optical fibers (arrays) 204a and 204b are connected to the left and right ends of a PLC chip 200 to input and output an optical signal. An electrode pad 201 is formed on the top surface of the PLC chip and an electrical connector 202 is provided on the electrode pad 201 via a solder layer 203.

Example 1 shows a basic structure in the present application. FIG. 2(a) is a top view of the planar lightwave circuit optical device of Example 1 and FIG. 2(b) is a cross-sectional view seen along dotted line IIb-IIb of FIG. 2(a).

The optical fibers 204a and 204b are connected to the respective ends of the PLC chip 200, which has an optical waveguide structure comprising a core and cladding, to input and output an optical signal. Electrode pads 201a-1 to 201a-n and 201b-1 to 201b-n are formed on the top surface of the PLC 200 and electrical connectors 202a and 202b are mounted on the electrode pads. The planar lightwave circuit optical device of the present invention has a structure in which the electrical connectors 202a and 202b are soldered to the electrode pads. Each of the electrical connectors 202a and 202b is connected to one of terminal groups of a corresponding one of flexible printed circuit (FPC) cables 205a and 205b. The other of the terminal groups of each of the FPC cables 205a and 205b is connected to a control substrate 207 via a corresponding one of electrical connectors 206a and 206b provided on the control substrate 207. The PLC chip 200 and the control substrate 207 are fixed to a metal mount 208.

As shown in FIG. 2(b), the electrode pad 201, which will be described in detail, is formed on the PLC chip. A lead pin 209 of the electrical connector 202 is fixed by the solder layer 203 to provide electrical continuity with the electrode pad 201. As a result, a planar lightwave circuit optical device characterized by comprising the electrode pad 201 on the surface of the PLC chip 200 (planar lightwave circuit), the solder layer 203 on the electrode pad 201 and in contact with the electrode pad 201, and the electrical connector 202 in contact with the solder layer 203 can be obtained.

Although the FPC cable is used as an example of the wire cable in Example 1, the wire cable may be a flat cable, a cable obtained by binding a plurality of wires, or the like.

Example 2

Figure 3:
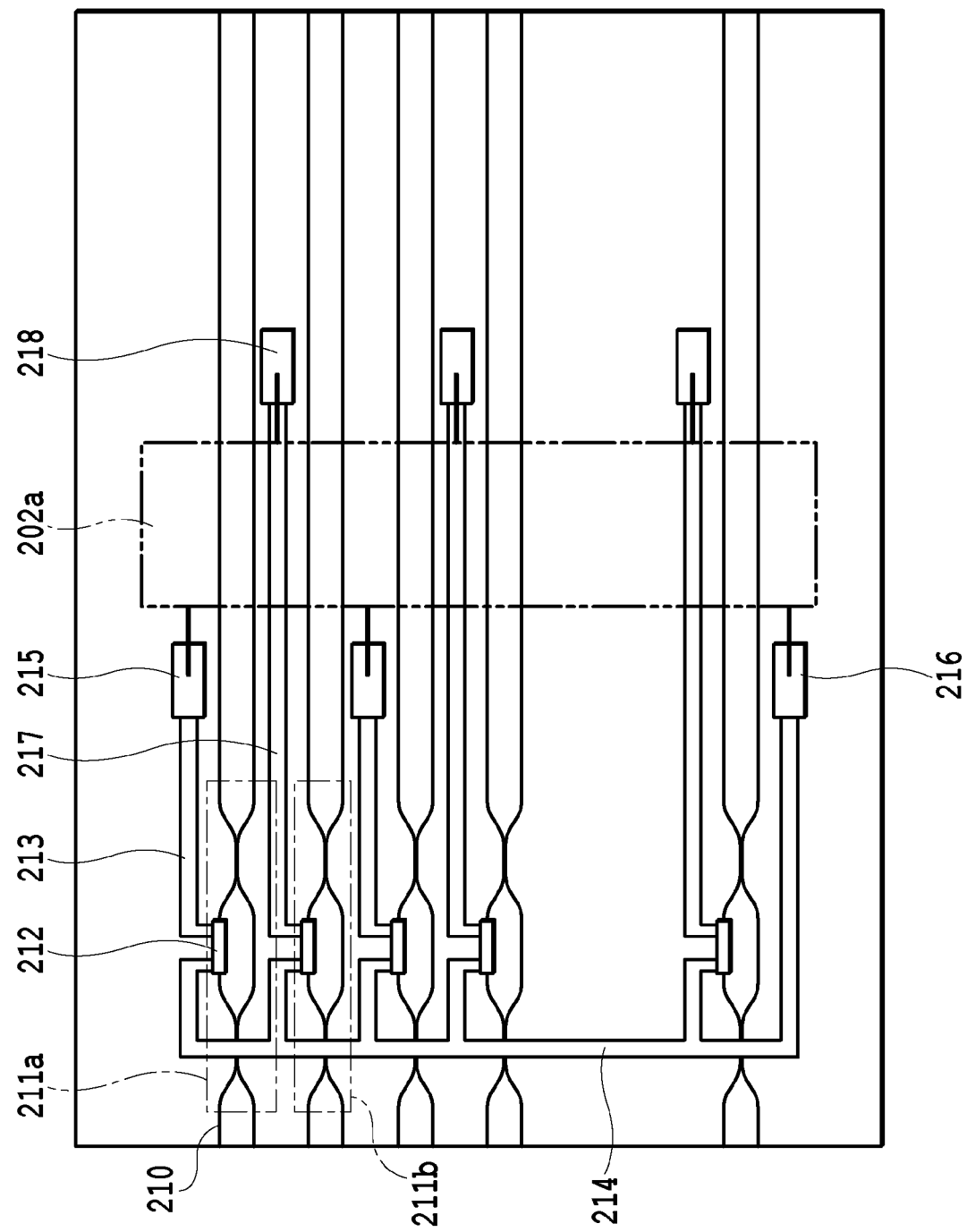
FIG. 3 is an enlarged view of an area enclosed by a dash-dotted line in FIG. 2(a)

FIG. 3 is an enlarged view of an area enclosed by dash-dotted line 219 in FIG. 2, showing a relationship among optical waveguide structures, electrode pads, connectors, and the like in Example 1. An optical signal input to an input waveguide 210 is input to a Mach-Zehnder interferometer 211a. An optical waveguide directly below a heater 212 is heated according to power applied to the heater 212 and the phase of light is modulated through the thermooptic effect. A multiplexing unit of the Mach-Zehnder interferometer can control the interference state to change an output port of the optical signal.

In general, in an optical switch, Mach-Zehnder interferometers are often arranged in a matrix. FIG. 3 shows one of columns of such a matrix. Further, an electrical connector connecting an FPC cable often has two columns of terminals (lead pins). Thus, connecting heaters on Mach-Zehnder interferometers arranged in one column alternately to two columns of lead pins of an electrical connector enables effective use of terminal electrodes of the electrical connector and reduction in the wire area, the number of connectors, and the connector mounting area. That is, one terminal of the heater loaded on the Mach-Zehnder interferometer 211a is connected to an electrode pad 215 via a wire 213 and the other terminal is connected to an electrode pad 216 via a common wire 214. One end of a heater loaded on a Mach-Zehnder interferometer 211b is connected to an electrode pad 218 via a wire 217 and the other terminal is connected to the electrode pad 216 via the common wire 214. As a result, a planar lightwave circuit optical device wherein the electrode pads 201a include the electrode pad 215 connected to a side surface of the electrical connector 202a and the electrode pad 218 connected to a side surface opposite to the side surface, the electrode pad 215 being connected to an electrical drive unit including the heater 212 can be obtained. As described above, arranging the electrode pads in two columns on the PLC as shown in FIG. 3 in line with the arrangement of lead pins of the electrical connector in two columns enables effective use of terminal electrodes of the electrical connector and reduction in the wire area, the number of connectors, and the connector mounting area.

Example 3

Figure 4:
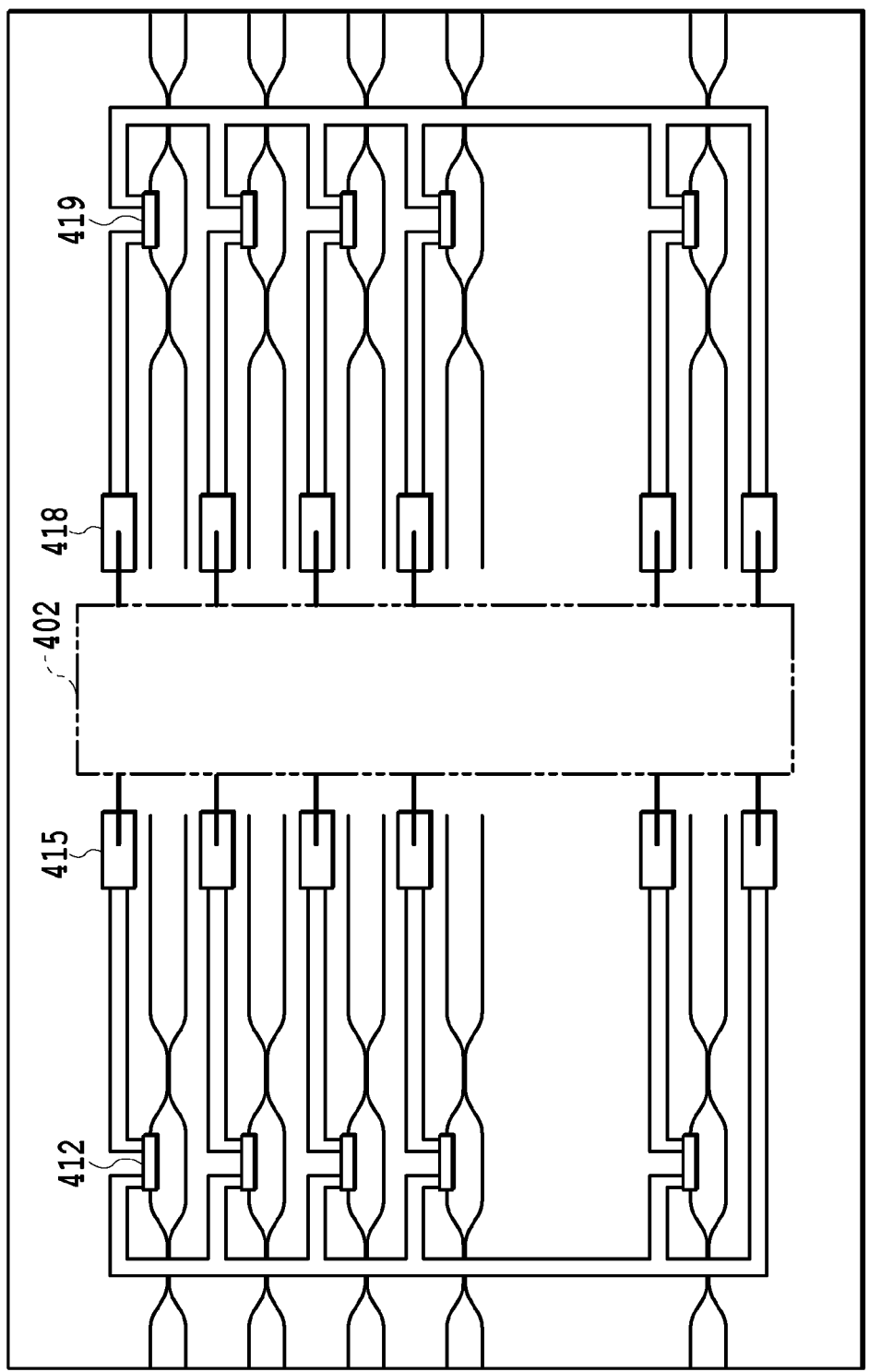
FIG. 4 is a diagram showing a planar lightwave circuit optical device of Example 3 of the present invention.

FIG. 4 is a diagram showing a second example of a relationship among optical waveguide structures, electrode pads 415 and 418, an electrical connector 402, and the like. As described above, in an optical switch, Mach-Zehnder interferometers are arranged in a matrix. A planar lightwave circuit optical device of Example 3 is characterized by comprising the electrode pad 415 connected to a side surface of the electrical connector 402 and the electrode pad 418 connected to a side surface opposite to the side surface, the electrode pad 415 being connected to a heater 412 of an electrical drive unit, the electrode pad 418 being connected to a heater 419 of an electrical drive unit. Thus, connecting a plurality of heaters loaded on Mach-Zehnder interferometers in two columns to one electrical connector also enables effective use of terminal electrodes of the electrical connector and reduction in the wire area, the number of connectors, and the connector mounting area.

Example 4

Figure 5:
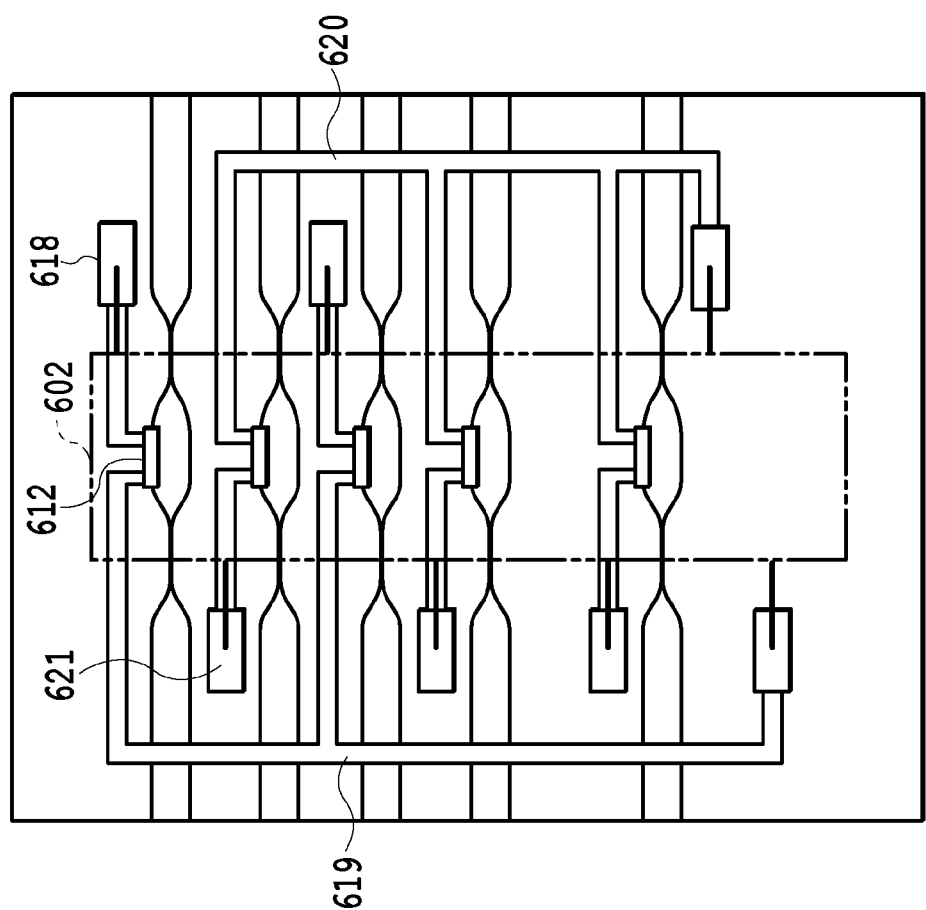
FIG. 5 is a diagram showing a planar lightwave circuit optical device of Example 4 of the present invention.

FIG. 5 is a diagram showing a third example of a relationship among optical waveguide structures, electrode pads, an electrical connector 602, and the like. In this embodiment, a connector having two columns of lead pins is arranged across one column of Mach-Zehnder interferometers. Heaters loaded on the respective Mach-Zehnder interferometers are provided such that terminals of the heaters are alternately connected to common wires and individual electrodes: for example, in FIG. 5, an uppermost heater 612 has a right electrode (electrode pad 618) connected to a lead pin of the electrical connector 602 and a left electrode connected to a common wire 619 and the second heater has a right electrode connected to a common wire 620 and a left electrode (electrode pad 621) connected to a lead pin of the connector. The planar lightwave circuit optical device of Example 3 is characterized in that the electrical connector 602 overlaps the heater 612 of the electrical drive unit. Examples 2 and 3 require an area for arranging the connector in addition to the Mach-Zehnder interferometer area, whereas Example 4 makes it possible to arrange the connector in the same area as the Mach-Zehnder interferometers and thus enables further downsizing of the PLC chip.

Example 5

Figure 6:
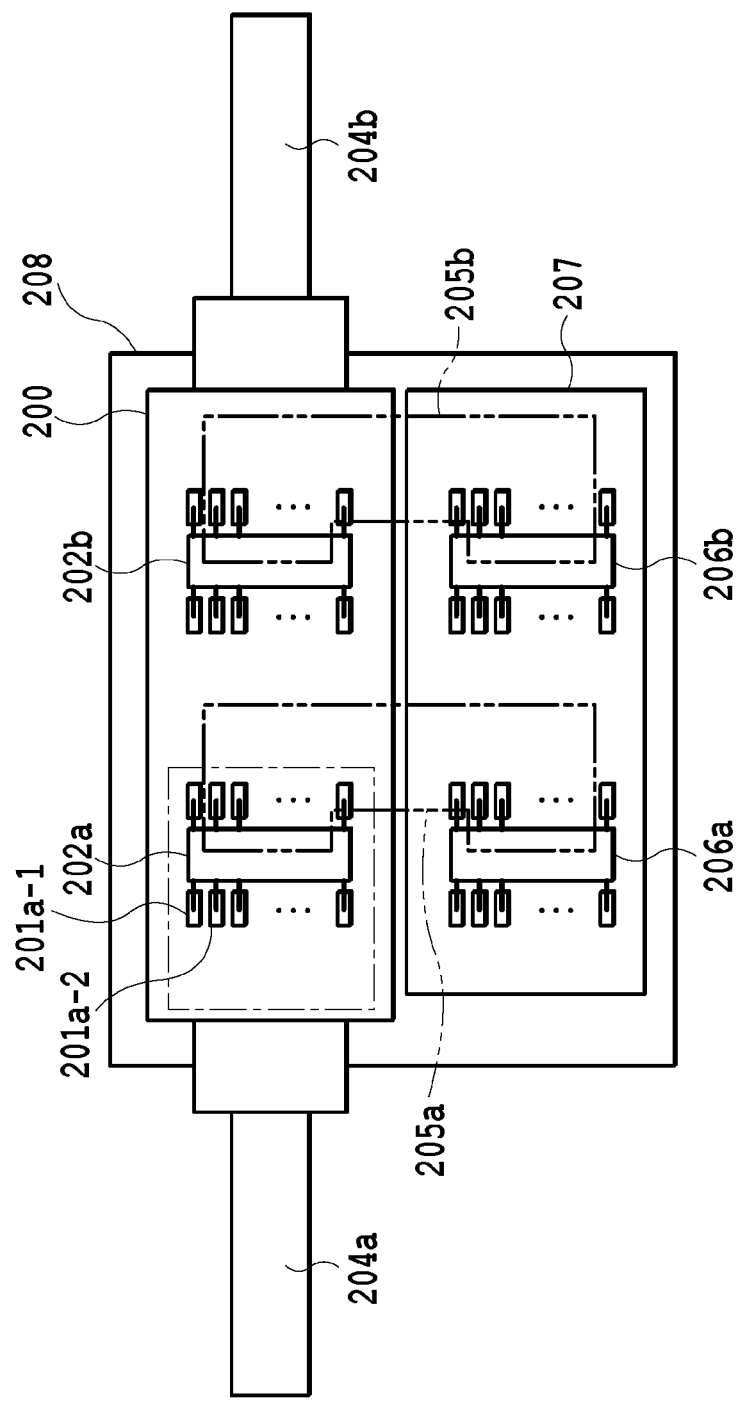
FIG. 6 is a diagram showing a planar lightwave circuit optical device of Example 5 of the present invention.

FIG. 6 is a diagram relating to a structure of the FPC cables 205a and 205b of Example 5.

FIG. 6 shows a structure in which the FPC cables 205a and 205b are inserted in the same direction into the connectors provided on the control substrate 207 and the PLC. That is, the terminals of the FPC cables are oriented in the same direction and the top surfaces of the FPC cables are U-shaped. After the PLC chip 200 and the control substrate 207 are provided on the mount 208, the FPC cables are inserted in a position direction, thereby contributing to improvement in workability.

Example 6

Figure 7:
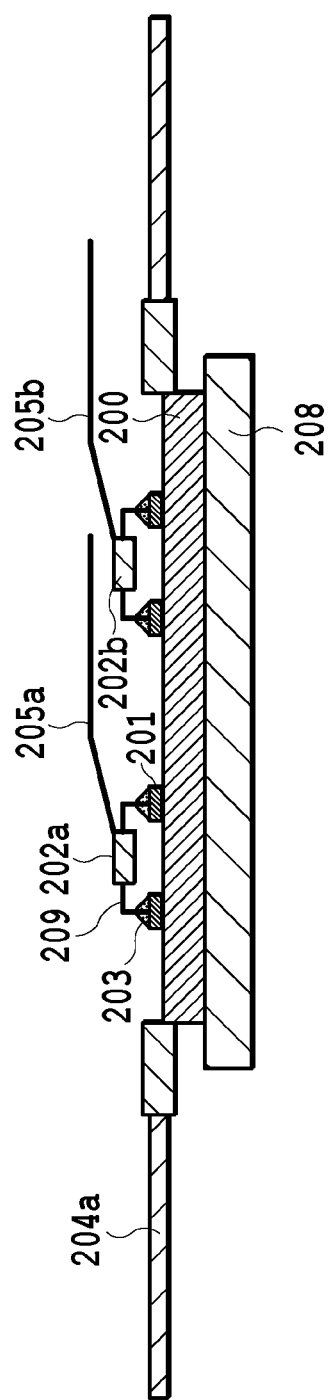
FIG. 7 is a cross-sectional view showing a planar lightwave circuit optical device of Example 6 of the present invention.

FIG. 7 relates to a connection structure of the FPC cables for further reducing chip power consumption as compared with Example 5 shown in FIG. 6. The structure is characterized in that an FPC cable covers an adjacent FPC connector or the like, whereby the FPC cable connected to the electrical connector does not contact the top surface of the heater of the electrical drive unit, that is, does not contact the PLC surface.

An optical switch using the thermooptic effect is driven by supplying power and heating heaters. If the heat of the heaters escapes to the outside, it is necessary to supply more power to the heaters, which leads to an increase in power consumption. Although the upper portions of the heaters are covered with a protective film, if the FPC cable contacts the film, the heat of the heaters escapes to the FPC cable having higher thermal conductivity than air.

As shown in FIG. 7, a structure in which the FPC cable 205a connected to the electrical connector 202a partly overlaps the adjacent electrical connector 202b can separate the FPC cable 205a from the PLC surface by the thickness of the FPC connector. Further, the FPC cable 205b inserted into the electrical connector 202b can be prevented from contacting the PLC surface by overlapping a fiber block of an input/output unit.

Example 7

Figure 8:
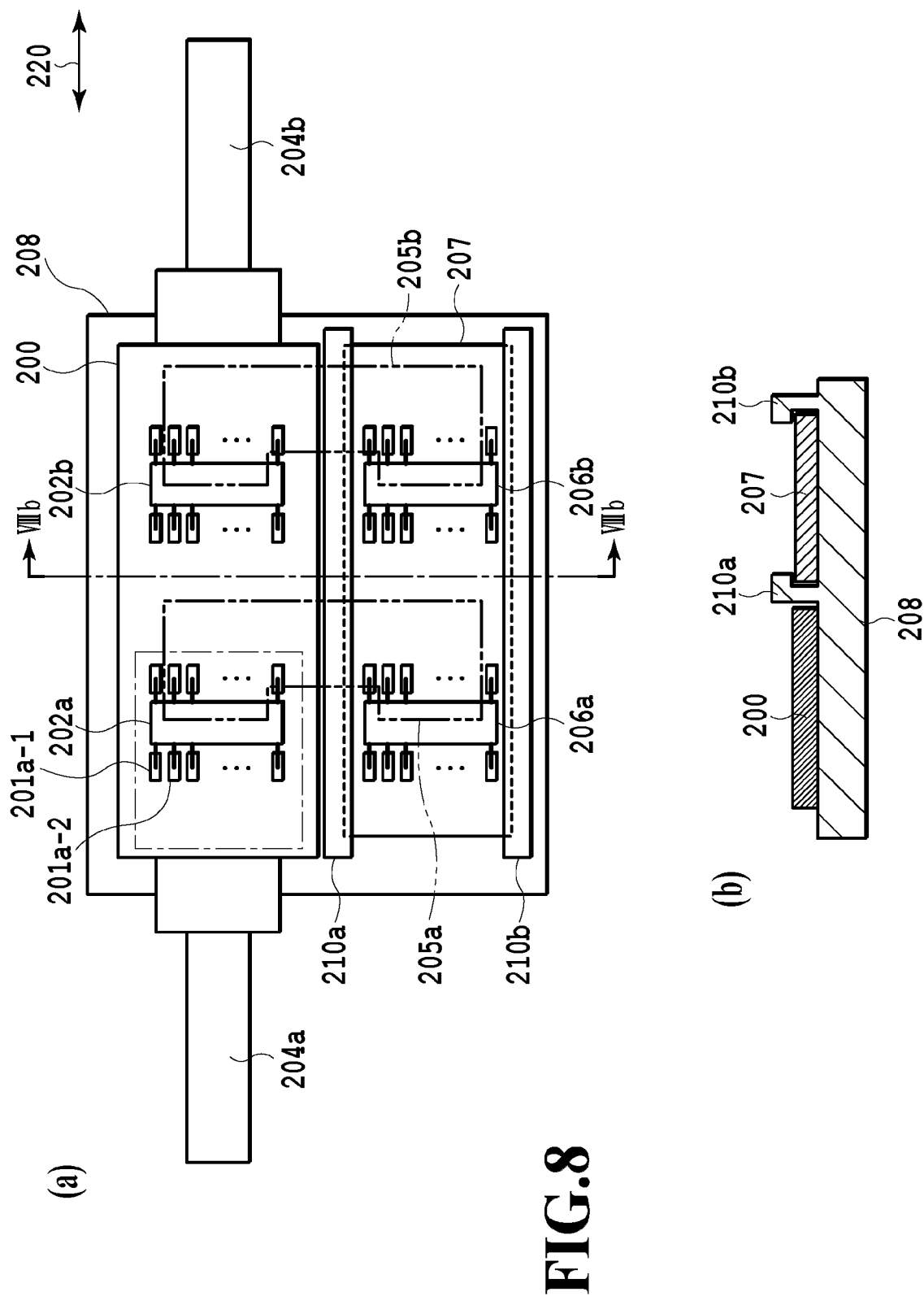
FIG. 8(a) is a top view showing a planar lightwave circuit optical device of Example 7 of the present invention.
FIG. 8(b) is a cross-sectional view showing the planar lightwave circuit optical device of Example 7 of the present invention shown in FIG. 8(a)

FIG. 8(a) and FIG. 8(b) are a top view and a cross-sectional view showing a method of providing the PLC chip 200 and the control substrate 207 on the mount 208 according to Example 7. In Examples 1 to 6 described above, the PLC chip 200 and the control substrate 207 are considered to be fixed to the mount 208 with an adhesive or a screw. However, if the PLC chip 200 and the control substrate 207 are fixed to the mount 208 and the positions of the PLC chip 200 and the control substrate 207 have an error with respect to the designed positions, shear stress is steadily induced in the electrical connectors 202a and 202b via the FPC. The shear stress induces a creep phenomenon and produces a reliability problem in the soldered portions of the electrical connectors 202a and 202b.

Example 7 shows a structure in which either the PLC chip 200 or the control substrate 207 is provided with a sliding mechanism to release the shear stress. FIG. 8(b) is a cross-sectional view along VIIIb-VIIIb of FIG. 8(a). As shown in FIG. 8(b), the mount 208 is provided with engagement portions 210a and 210b and the control substrate 207 is not fixed to the mount 208 but is provided so as to move freely in the directions of arrow 220. The installation method of Example 7 reduces the shear stress on the soldered portions and contributes to reliability improvement.

Although an example of mounting the two electrical connectors 202a and 202b having the same number of poles has been described, it is evident that one or more connectors having different numbers of poles may be mounted.

Although the optical switch which performs optical signal routing by means of the Mach-Zehnder interferometers has been described in this example, it is evident that the present invention is applicable to not only the optical switch but also an optical device such as an optical variable attenuator or a wavelength variable filter.

Example 8

Figure 9:
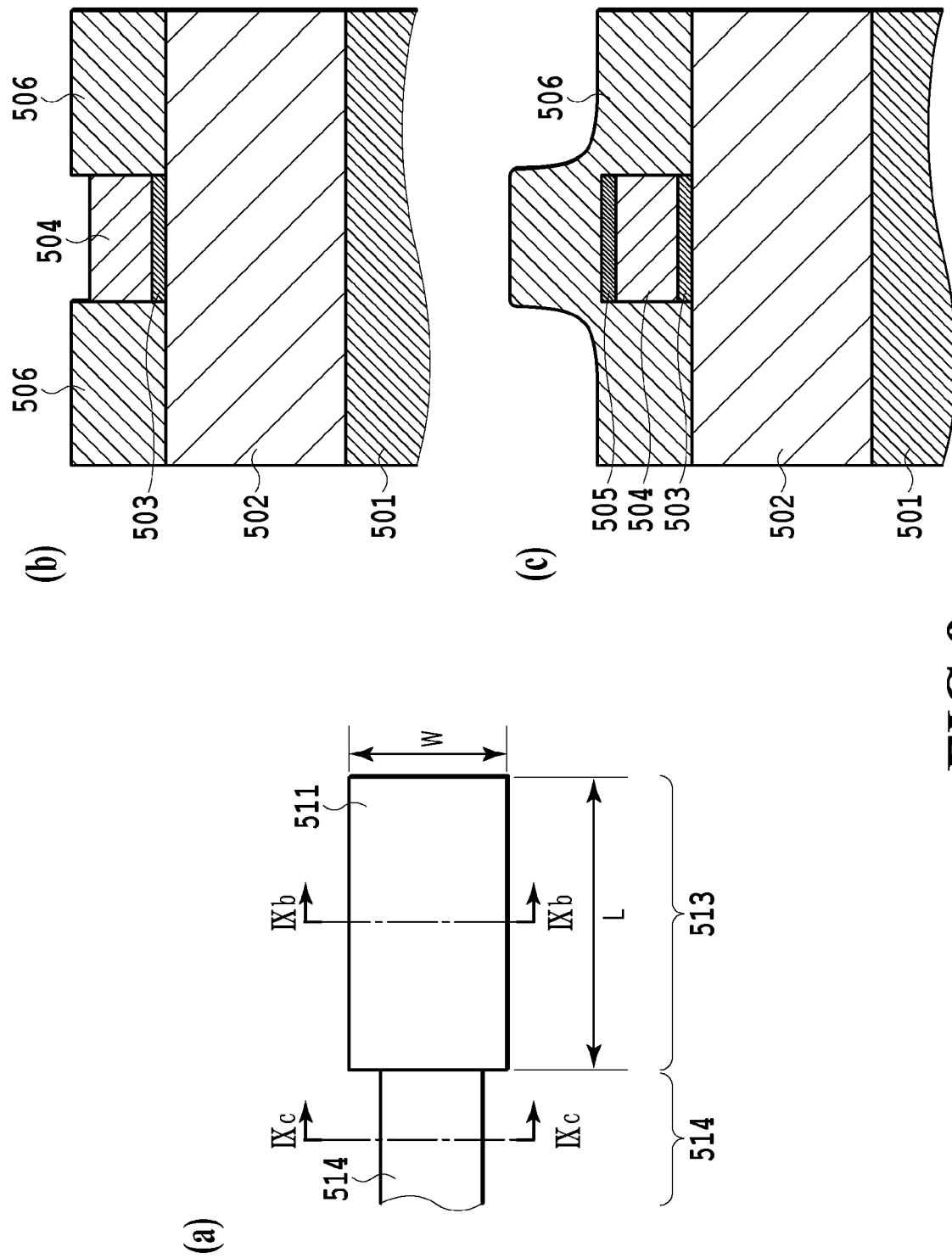
FIG. 9(a) is a top view of an electrode pad in a planar lightwave circuit optical device of Example 8 of the present invention.
FIG. 9(b) is a cross-sectional view along dotted and dashed line IXb-IXb in FIG. 9(a).
FIG. 9(c) is a cross-sectional view along dotted and dashed line IXc-IXc in FIG. 9(a)

In Example 8, a layer structure of an electrode pad in a planar lightwave circuit optical device of the present invention will be described with reference to FIG. 9. FIG. 9(a) is a top view of the electrode pad in the planar lightwave circuit optical device of Example 8. FIG. 9(b) is a cross-sectional view along dotted and dashed line IXb-IXb in FIG. 9(a). FIG. 9(c) is a cross-sectional view along dotted and dashed line IXc-IXc in FIG. 9(a).

An electrode pad 513 in the planar lightwave circuit optical device of Example 8 includes metal layers laminated on a cladding layer 502 of an optical waveguide formed on a silicon substrate 501 and is connected to a heater not shown in FIG. 9(a) via a wire 51. Although a protective film 506 is formed on the entire surface of the planar lightwave circuit optical device for protecting the wire 514, the electrode pad 513 has an exposure area 511 formed by removing the protective film 506 to expose the metal layers. A lead pin of an electrical connector is soldered to the exposure area 511.

FIG. 9(b) and FIG. 9(c) show cross-sectional views along dotted and dashed lines IXb-IXb and IXc-IXc in the top view of FIG. 9(a).

The metal layers include a first adhesive layer 503, an electrically conductive layer 504, and a second adhesive layer 505. It is preferable that the first adhesive layer 503 has good adhesion to the cladding layer 502 and the second adhesive layer 505 has good adhesion to the protective film 506. For example, chromium can be used if the cladding layer 502 and the protective film 506 are formed of silica-based glass. It is preferable that the electrically conductive layer 504 is formed of a material having small electrical resistance such as gold.

The connector is soldered to the electrode pad 513 through the process described below. That is, a mask corresponding to the arrangement of a plurality of electrode pads on the planar lightwave circuit optical device is prepared. For example, a stainless steel plate having openings in the same positions as the electrode pads can be used as the mask. The mask is arranged such that the openings of the mask are aligned with the electrode pads on the planar lightwave circuit optical device, and then a solder paste such as SnAgCu is applied to the mask by means of a squeegee.

Figure 10:
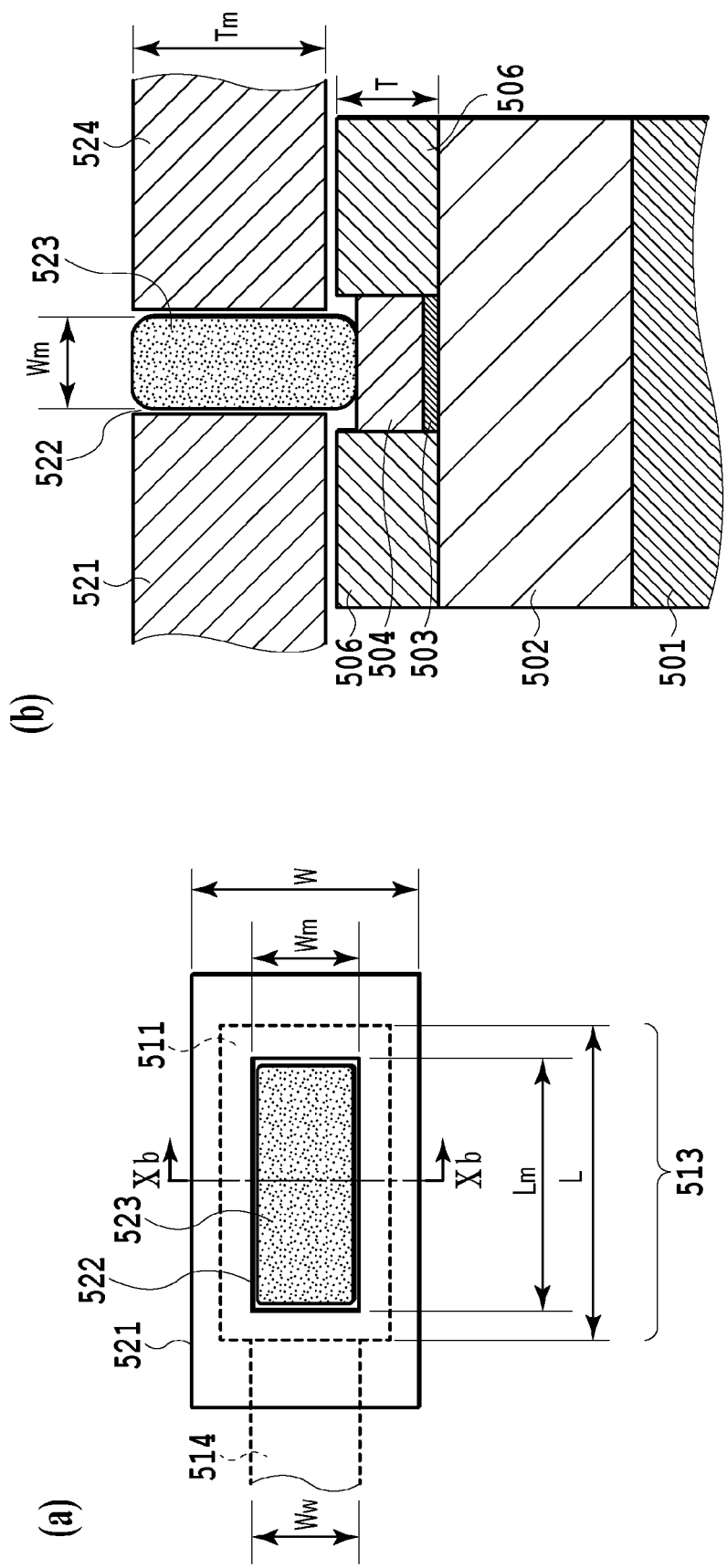
FIG. 10(a) is a top view schematically showing a process in Example 8 of the present invention.
FIG. 10(b) is a cross-sectional view along dotted and dashed line Xb-Xb in FIG. 10(a)

FIG. 10 is a diagram schematically showing the above process. FIG. 10(a) is a top view schematically showing the process in Example 8. FIG. 10(b) is a cross-sectional view along dotted and dashed line Xb-Xb in FIG. 10(a). A mask 521 has an opening 522 corresponding to the electrode pad 513. Although the opening 522 may have the same size and shape as the exposure area 511 of the electrode pad 513, it is preferable that the opening 522 is smaller than the exposure area 511 in consideration of an error in manufacturing the mask 521, an error in alignment with the electrode pad 513, and the like. After the mask 521 is aligned as shown in FIG. 10(a), a solder paste 523 is applied to the opening 522. Next, a squeegee travels across a mask surface 524 to arrange a desired amount of solder paste 523 on the exposure area 511 of the electrode pad. After that, the mask 521 is removed. Finally, the electrical connector is aligned with and mounted on the electrode pad, and the planar lightwave circuit optical device is heated to a temperature equal to or higher than the melting point of solder and then cooled, whereby the electrical connector is fixed.

Sn solder such as SnAgCu has a melting point of about 217° C. and thus enables soldering at low temperature. However, a black pad phenomenon in which Sn solder erodes gold is publicly known. Gold is often used as an electrically conductive layer of an electrode pad of an optical device. If SnAgCu is used, the black pad phenomenon not only interferes with solder application but also embrittles a joint and causes a reliability problem.

In the case of using SnAgCu solder, if the weight ratio of gold as the electrically conductive layer is large, the solder erodes the gold and a good solder joint cannot be obtained. It is generally known that reliability cannot be maintained if the weight ratio of gold to solder exceeds 5% (see NPL 3 for example).

Figure 12:
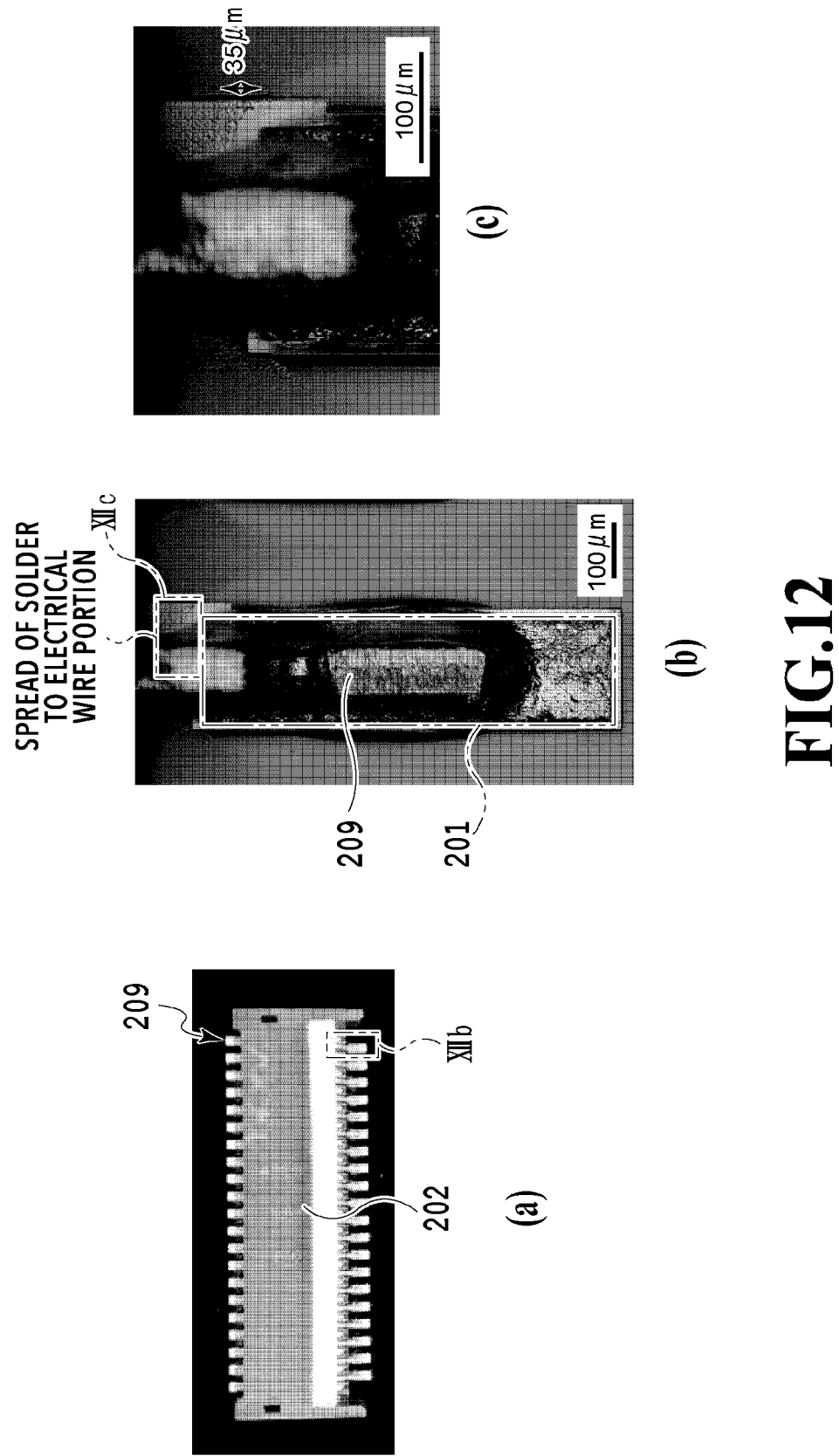
FIG. 12(a) is a diagram showing the vicinity of a lead pin 209 connected to an electrode pad 201.
FIG. 12(b) is an enlarged view of the vicinity of the lead pin 209.
FIG. 12(c) is an enlarged view of area XIIc.
Figure 13:
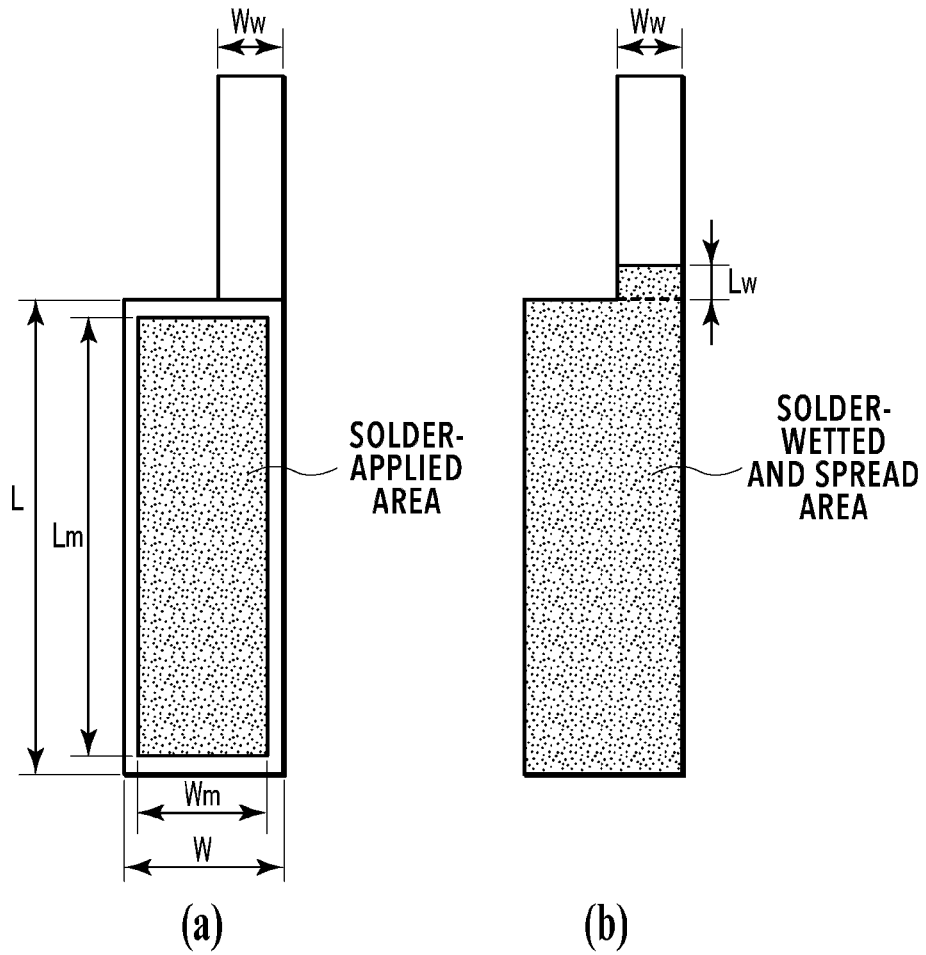
FIG. 13(a) is a diagram showing an area to which solder is applied.
FIG. 13(b) is a diagram showing an area wetted and spread with solder.

The amount of solder to be applied is determined as described below. FIG. 12(a) is a photograph of an electrical connector 202 soldered onto a PLC chip. FIG. 12(b) is an enlarged view of the vicinity XIIb of a lead pin 209 connected to an electrode pad 201 in FIG. 12(a). FIG. 12(b) shows the spread of solder to an electrical wire portion in area XIIc. FIG. 12(c) is an enlarged view of area XIIc. FIG. 13(a) is a diagram showing an area to which solder is applied. FIG. 13(b) is a diagram showing an area to wetted and spread with solder. In the observation photographs shown in FIGS. 12(a) to (c), the electrically conductive layer 504 has a thickness T of 1 μm.

As shown in FIG. 13(a), on the assumption that the opening 522 has a width Wm and a length Lm and the mask has a thickness Tm, the volume of the solder-applied area per electrode pad is about $W_m \times L_m \times T_m$.

On the other hand, on the assumption that the electrode pad has a width W and a length L and the electrically conductive layer has a thickness T, the volume of gold included in the electrode pad is W×L×T as shown in FIG. 13(b). However, gold is also supplied from the wire 514 having a width $W_w$. According to the inventors, since the gold supplied from the wire 514 has a length $L_w$ of about 35 μm as shown in FIG. 12(c), the amount of gold supply from the wire 514 is expected to be about $W_w \times T \times 35T$. Further, a lead pin of an electrical connector is generally coated with gold plating and the weight thereof is assumed to be mc.

On the assumption that the density of solder is $\rho_s$ and the density of gold is $\rho_A$, the weights of the solder and gold are $\rho_s \times W_m \times L_m \times T_m$ and $\rho_A \times (W \times L \times T + W_w \times 35T \times T) + m_c$, respectively.

Accordingly, the amount of solder is determined to satisfy:

$$\{\rho_A \times (W \times L \times T + W_w \times 35T \times T) + m_c\}/\{\rho_s \times W_m \times L_m \times T_m\} < 0.05.$$

Since NPL 3 states that the connection strength decreases if the solder content exceeds 5%, the amount is set to a value less than 0.05. In view of long-term reliability, the value is preferably less than 0.03. The amount of solder can be controlled by controlling the thickness Tm of the mask.

Examples of numerical values will be provided below. The density of gold is $\rho_A = 19.32$ g/cm³ and the density of solder is $\rho_s = 7.46$ g/cm³. The dimensions of the electrode pad 513 are W=220 μm and L=700 μm, the thickness of the metal film is T=1.0 μm, and the dimensions of the opening 522 of the mask are $W_m = 220$ μm and $L_m = 560$ μm. For example, in the case of using an electrical connector made by Japan Aviation Electronics Industry, Ltd. (FF08-71SA), since the weight of Au included in plating on a lead pin surface is $m_c = 4.8 \times 10^{-7}$ g, the thickness may be set to:

$$T_m > 85 \text{ μm}.$$

Example 9

Example 9 shows a layer structure of metal layers in the case where the resistance of the wire 514 up to the heater affects device performance. If the wire resistance becomes a problem, the resistance can be reduced by increasing the thickness of the wire layer but this makes the black pad phenomenon apparent. In this case, a barrier layer 531 may be introduced as shown in FIG. 11.

Figure 11:
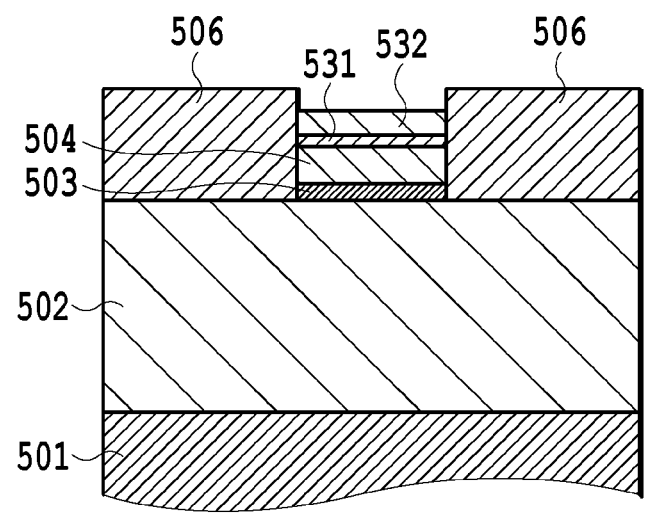
FIG. 11 is a diagram showing Example 9.

In FIG. 11, the barrier layer 531 is introduced on the electrically conductive layer 504. An antioxidant layer 532 may be introduced on the barrier layer 531. As the barrier layer 531, nickel or platinum can be used. The barrier layer 531 also functions as a barrier against the first adhesive layer. That is, if silica-based glass is used as the cladding layer 502, chromium is introduced as the first adhesive layer such that gold as the electrically conductive layer 504 adheres well to the cladding layer. However, if solder erodes the gold, the solder acts on chromium. It is generally known that solder has poor adhesion to chromium and this interferes with a good solder joint. Accordingly, introducing the barrier layer can prevent both of the black bad phenomenon and the action of solder on chromium, thereby enabling a good solder joint.

The use of nickel for the barrier layer 531 possess the advantage of material inexpensiveness. On the other hand, the use of platinum for the barrier layer 531 is advantageous in process. More specifically, since platinum is insoluble in a strong acid solution, it can undergo cleaning using a mixed solution of sulfuric acid ($H_2SO_4$) and hydrogen peroxide ($H_2O_2$) (i.e., piranha cleaning) to remove burrs and organic substances produced at the ends of wires at the time of forming electrode pads. Thus, the use of platinum for the barrier layer is beneficial in increasing process flexibility.

The barrier layer is provided in the case where the black pad phenomenon is apparent like this example. If the phenomenon is not apparent, there is no need to provide the barrier layer.

Although the present invention is applied to the optical switch in the examples described above, the present invention is also applicable to an optical device such as an optical variable attenuator or a wavelength variable filter.

Although the electrical connector for FPC-substrate connection is used as the electrical connector in the examples described above, it is evident that an electrical connector for substrate-substrate connection or an electrical connector for cable-substrate connection can be used.

Although SnAgCu solder is used as the solder, it is evident that AuSn solder and the like may also be used.

ADVANTAGEOUS EFFECTS OF INVENTION

Electrical connection from the top surface of the chip to the electrode wires of the optical switch using the electrical connectors (FPC connectors) has three advantageous effects described below.

The first advantageous effect is downsizing of the chip. In a conventional structure of an optical device, electrode pads for wire bonding are arranged in one column on one side of a chip to facilitate wire bonding and electrode wires needs to be routed to arrange the electrode pads in one column, which eventually increases an area necessary for electrode wires on the chip. In contrast, in the present invention, since electrical wires are pulled from the top surface of a chip, electrode pads can be arranged in any positions on the chip. This eliminates the need to route electrical wires and reduces an area necessary for electrode wires on the chip. As a result, the chip can be downsized.

The second advantageous effect is a reduction in mounting cost. A conventional optical switch requires wire bonding of several hundreds of wires per chip and entails a high cost for wire bonding. In contrast, the structure of the present invention enables installation of general-purpose electrical connectors using a general-purpose mounting method generally used for mounting electronic devices.

Here, reflow mounting of electronic devices will be briefly described. In the process of assembling electronic devices, after a solder paste is automatically screen-printed on a printed circuit board, several electronic devices are arranged rapidly and automatically on the printed circuit board per second by using a chip mounter and then the printed circuit board passes through a reflow oven, whereby the electronic devices are collectively soldered. The structure of the present invention makes it possible to mount electrical connectors rapidly and automatically on a wafer by using a chip mounter and solder the electrical connectors collectively by causing the wafer to pass through a reflow oven. This mounting method not only remarkably increases mass production throughput as compared with conventional wire bonding connection but also leads to a large reduction in mounting cost. Since electrical mounting is possible at wafer level, the mounting cost can be largely reduced.

The third advantageous effect is simplification of an inspection process. In a test for continuity between electrodes of a conventional optical switch, continuity is checked by placing a needle on each pad. In contrast, in the present invention, continuity between a plurality of terminals can be checked at a time by mounting an FPC connector and then inserting an FPC for inspection into the connector. Further, the inspection process can be performed not at chip level but at wafer level with high throughput. Thus, the inspection process can be simplified and shortened.

Because of the advantageous effects described above, an electrode wire structure of accommodating electrode wires of an optical switch on the top surface of a chip by using electrical connectors can markedly contribute to mass production of optical switches.

This mounting method not only remarkably increases mass production throughput as compared with conventional wire bonding connection but also leads to a large reduction in mounting cost.

INDUSTRIAL APPLICABILITY

The present invention is applicable to the technology of a planar lightwave circuit optical device used in optical communications.

The invention claimed is:

1. A planar lightwave circuit optical device comprising:
a plurality of electrode pads over a surface of a planar lightwave circuit;
a solder layer over the electrode pads and in contact with the electrode pads; and
an electrical connector in contact with the solder layer,
wherein the electrode pads are connected to a plurality of electrical drive units, and
wherein the electrode pads comprise a first electrode pad group connected to a side surface of the electrical connector and a second electrode pad group connected to a side surface opposite to the side surface,
each pad of the first electrode pad group is connected to one end of each of odd-numbered ones of the electrical drive units and the other end of each of the odd-numbered ones is connected to one third electrode pad via a common wire, and
each pad of the second electrode pad group is connected to one end of each of even-numbered ones of the electrical drive units and the other end of each of the even-numbered ones is connected to the third electrode pad via the common wire.

2. A planar lightwave circuit optical device comprising:
a plurality of electrode pads over a surface of a planar lightwave circuit;
a solder layer over the electrode pads and in contact with the electrode pads; and
an electrical connector in contact with the solder layer,
wherein the electrode pads are connected to a plurality of electrical drive units, and
wherein the electrode pads include a first electrode pad group connected to a side surface of the electrical connector and a second electrode pad group connected to a side surface opposite to the side surface,
the electrical drive units are a first electrical drive unit and a second electrical drive unit,
each first electrode pad of the first electrode pad group is connected to one end of the first electrical drive unit and the other end of the first electrical drive unit is connected to one third electrode pad via a common wire, and
each second electrode pad of the second electrode pad group is connected to one of end of the second electrical drive unit and the other end of the second electrical drive unit is connected to the third electrode pad via the common wire.

3. The planar lightwave circuit optical device according to claim 1 or 2 wherein the electrical connector is arranged so as to overlap the electrical drive units.

4. The planar lightwave circuit optical device according to claim 1 or 2 wherein a top surface of an FPC cable connected to the electrical connector is U-shaped.

5. The planar lightwave circuit optical device according to claim 4, wherein the FPC cable connected to the electrical connector is not in contact with a top surface of a heater of an electrical drive unit.

6. The planar lightwave circuit optical device according to claim 1 or 2 wherein an engagement portion is provided on a mount under the planar lightwave circuit.

7. The planar lightwave circuit optical device according to claim 1 or 2,
wherein each of the electrode pads comprises a laminated structure including a first adhesive layer,
an electrically conductive layer, and
a second adhesive layer.

8. The planar lightwave circuit optical device according to claim 7,
wherein each of the electrode pads includes a laminated structure between the electrically
conductive layer and the second adhesive layer and the laminated structure comprises a barrier layer for improving connection between the electrical connector and the solder layer,
wherein each of the electrode pads comprises a contact layer between the barrier layer and the second adhesive layer, and
wherein the barrier layer includes Ni or Pt,
the contact layer includes Au,
the second adhesive layer includes Cr or Ti, and
the electrically conductive layer includes Au.

9. The planar lightwave circuit optical device according to claim 7, wherein each of the electrode pads comprises:
(1) an electrically conductive layer in contact with the solder layer; or
(2) an electrically conductive layer and a contact layer between the solder layer and
the electrically conductive layer and in contact with the solder layer,
the solder layer includes Sn, and
in a case where a width of the electrode pad is W, a length of the electrode pad is L, a thickness of the electrically conductive layer in contact with the solder layer or the contact layer in contact with the solder layer is T, a density of solder in the solder layer is ps, a density of gold included in the electrically conductive layer in contact with the solder layer or the contact layer in contact with the solder layer is pA, a width of an opening of a mask corresponding to arrangement of the electrode pad is Wm, a length of the opening is Lm, a thickness of the opening is Tm, and an amount of solder in plating on a lead pin of the electrical connector is mc, the following formula is satisfied:

$$\{\rho_A \times (W \times L \times T + W_w \times 35 T \times T) + m_c\} / \{\rho_s \times W_m \times L_m \times T_m\} < 0.05.$$

10. The planar lightwave circuit optical device according to claim 1 or 2, wherein the planar lightwave circuit comprises:

an optical waveguide including an Si substrate, an SiO2 layer, and a layer including a semiconductor material; and a plurality of electrical wires.

11. The planar lightwave circuit optical device according to claim 1 or 2 wherein the electrical connector is an electrical connector for FPC substrate connection, an electrical connector for substrate-substrate connection, or an electrical connector for cable-substrate connection.

* * * * *